Sept. 10, 1957  C. A. SCHACHT, JR  2,805,488
GAUGE FOR COILED SPRINGS
Filed Dec. 22, 1954

INVENTOR.
Clifford Arthur Schacht Jr.
BY
Otto A. Earl
Attorney.

United States Patent Office 2,805,488
Patented Sept. 10, 1957

2,805,488
GAUGE FOR COILED SPRINGS

Clifford Arthur Schacht, Jr., Hartford City, Ind., assignor to Overhead Door Corporation, Hartford City, Ind.

Application December 22, 1954, Serial No. 477,087

4 Claims. (Cl. 33—199)

This invention relates to a gauge for coiled springs such for example as the counterbalancing springs of upwardly acting door assemblies.

The main objects of this invention are:

First, to provide a gauge for determining the diameter or gauge of the wire of a helically coiled spring.

Second, to provide a gauge for determining the diameter of coils of the wire of a helically coiled spring which enables the engaging of a spring while it is in mounted position, for example, a counterbalance spring in an upwardly acting door assembly.

Third, to provide a gauge for coiled springs, the use of which results in a great saving of time and labor in the servicing of structures which include coiled springs as an element.

Fourth, to provide a gauge for coiled springs having these advantages in which the handle and blades are so related that the blades may be thrust against the side of a helically coiled spring to facilitate the gauging thereof.

Objects relating to details and economies of the invention will appear from the description to follow. The invention is defined and pointed out in the claims.

A preferred embodiment of the invention is illustrated in the accompanying drawing, in which.

Figure 1:
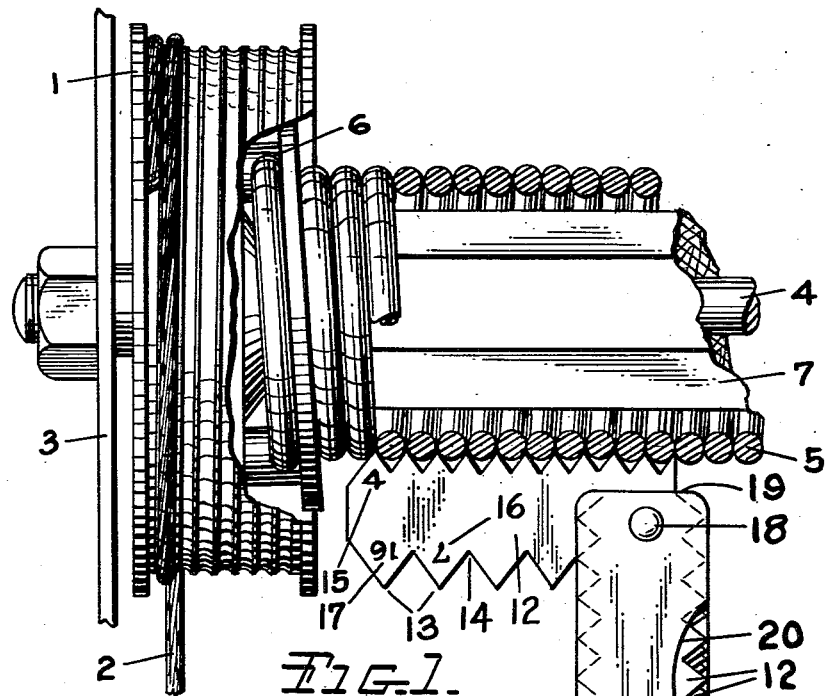
Fig. 1 is a fragmentary view partially in elevation and partly in section of parts of a counterbalancing assembly of an upwardly acting door with the gauge of this invention in gauging relation to the counterbalancing spring thereof.
Figure 2:
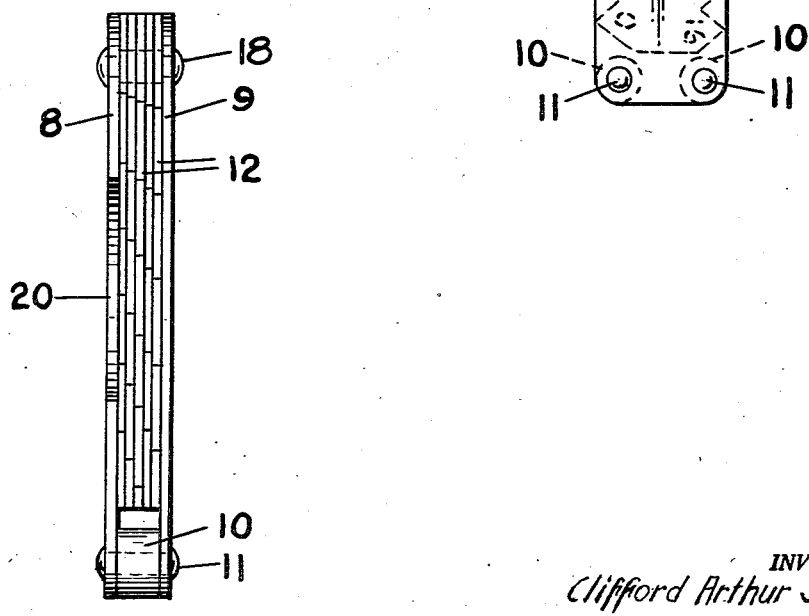
Fig. 2 is an edge view of the gauge with the blades collapsed, looking from the right of Fig. 1.

In the accompanying drawing 1 represents the winding drum for the cable 2 of an upwardly acting door. 3 represents a support for the shaft 4 by which the drum 1 is carried.

The counterbalancing spring 5 is of helically coiled type and is connected at 6 to the drum 1, its other end being fixedly supported. The support therefor is not illustrated but it may be such as illustrated in the patent to Moler No. 2,600,753, issued December 1, 1953. The spacing core 7 prevents the buckling or kinking of the spring under stress. It will be understood that the cable 2 is connected to the bottom of the door.

The gauge of my invention comprises a pair of handle members 8 and 9 formed of flat plate stock and fixedly connected at their outer ends in spaced parallel relation as by means of the spacing blocks 10 and the through rivets 11. The blades 12 are also formed of flat stock and are the same except for the spacing of the gauge elements 13 which are defined on each edge of each blade by V-shaped notches 14. The tips of the gauge elements on the two edges are in parallel planes.

Gauge indicia numerals are applied to the blades as 15, 16 and 17 shown in Fig. 1, which indicates that the gauge elements on one side edge of the blade are 7/16 and on the other 5/16 of an inch. The several blades have different gauging elements on their edges, that is, the gauge elements are spaced for gauging different diameters of wire.

The several gauge blades are supported on the single pivot 18 to be collapsed within the handle or to be selectively swung to a right angular position relative to the handle as shown in Fig. 1, in which position the outer edge of a blade can be thrust against the spring 5 to determine the diameter of the wire thereof. In this case illustrated it would be #4 wire.

It will be noted that when a blade is open its inner edge projects from the inner end 19 of the handle so that the handle may be used to thrust the blade against the spring being gauged without collapsing the blade. This greatly facilitates the use of the gauge and the accuracy of the gauging. The blade is in the same relative position to the handle whether it projects to the left of the handle as illustrated or to the right thereof. The one handle member is provided with a finger opening 20 on one edge thereof which facilitates the opening of the blades.

The gauge of this invention greatly facilitates the servicing of structures which include coiled springs as an element, such as upwardly acting doors which are provided with counterbalancing springs. To illustrate: Assume that a spring is broken on an upwardly acting door which has been installed for a period of years and all identification has been removed or is missing. The servicing of such a door commonly means the lifting of the door by a block-and-fall, jack or other suitable means so that a scale may be placed under the door to determine its weight so that a spring can be selected of the right gauge of wire to counterbalance the load of the door. With the weight determined the repairman must then order a spring from the factory or warehouse to replace the broken spring, all of which involves time and labor.

With the gauge of this invention the repairman or other person can properly determine the gauge of the wire in the spring and determine its length, and then communicate with the factory or warehouse; the spring can be quickly supplied to provide speedy service with a minimum of labor. Further, the factory or distributor's warehouse has a supply of springs of different wire gauges or sizes and it is quite impossible to select by eye. Identification tags or marks are very frequently displaced and lost in the handling incident to shipping and the like. With the gauge of this invention a spring of desired gauge can be selected, which results in a great saving of time and inconvenience and minimizes the cost of servicing and upkeep.

I have illustrated and described my invention in a highly practical embodiment thereof. I have not attempted to illustrate or describe other adaptations or embodiments as it is believed this disclosure will enable those skilled in the art to practice my invention as may be desired.

Having thus described my invention, what I claim as new and desire to secure by Letters Patent is:

1. In a gauge for coiled springs, the combination of a handle comprising side members fixedly connected at their outer ends in spaced parallel relation, and a plurality of flat generally rectangular blades of substantially uniform dimensions pivotally mounted in side by side relation on the inner ends of said handle members to collapse between them or to be selectively positioned in substantially right angular relation to the handle, each edge of each blade having a series of uniform V-shaped notches extending from end to end thereof and providing a series of duplicate gauge elements having aligned tips, the gauge element tips of the blades being in parallel relation, the width of the blades being such that when a blade is disposed in substantially right angular relation to the handle to project in either direction therefrom the complete gauging edge of the blade is exposed for engagement with the work with a portion of the gauging elements in alignment with the handle to facilitate the positioning and holding of the blade in gauging relation to the work.

2. In a gauge for coiled springs, the combination of a handle comprising side members fixedly connected at their outer ends in spaced parallel relation, a plurality of flat generally rectangular blades of substantially uniform dimensions pivotally mounted in side by side relation between the inner ends of said handle members to collapse between them or to be selectively positioned in substantially right angular relation to the handle, each edge of each blade having a uniform aligned series of duplicate gauge elements extending from end to end thereof, the blades being of such width that when a blade is disposed in substantially right angular relation to the handle to project in either direction therefrom the complete gauging edge of the blade is exposed for engagement with the work with portions of the gauging elements at the end of the handle and positioned at both sides of the plane of the pivot to facilitate positioning the blade in gauging relation to the work.

3. In a gauge for coiled springs, the combination of a handle comprising side members fixedly connected at their outer ends, a plurality of elongated blades having parallel longitudinal edges pivotally mounted in side by side relation on the inner end of said handle members to collapse between them or to be selectively positioned in substantially right angular relation to the handle, each blade having a uniform series of gauge elements on each of its parallel edges, the pivotal connections for the blades to the handle being such that when a blade is disposed in right angular relation to the handle a complete gauging edge of the blade is exposed beyond the end of the handle for engagement with the work.

4. In a gauge for coiled springs, the combination of a handle comprising side members fixedly connected at their outer ends in spaced parallel relation, and a plurality of elongated blades having parallel longitudinal edges pivotally mounted in side by side relation on the inner ends of the handle members to collapse between them or to be selectively positioned in angular relation to the handle with an edge portion of the blade projecting from the inner end of the handle in the plane thereof, each blade having a series of uniform V-shaped notches on at least one of its longitudinal edges providing a series of uniform gauge elements extending from end to end of the notched edge of the blade.

References Cited in the file of this patent

UNITED STATES PATENTS

| | | |
|---|---|---|
| 85,553 | Adams | Jan. 5, 1869 |
| 552,238 | Darling | Dec. 31, 1895 |
| 590,486 | Sawyer | Sept. 21, 1897 |